United States Patent
Groenjes et al.

(10) Patent No.: US 8,467,321 B1
(45) Date of Patent: Jun. 18, 2013

(54) REAL TIME VOICE QUALITY STATISTICS IN AUDIO TELECONFERENCING

(75) Inventors: Jason Howard Groenjes, Omaha, NE (US); Srinivas Maganti, Andhra Pradesh (IN); Myron P Sojka, Logan, IA (US); Mark Steven Jarzynka, Omaha, NE (US)

(73) Assignee: West Corporation, Omaha, NE (US)

( * ) Notice: Subject to any disclaimer, the term of this patent is extended or adjusted under 35 U.S.C. 154(b) by 151 days.

(21) Appl. No.: 12/547,565

(22) Filed: Aug. 26, 2009

(51) Int. Cl.
*H04L 12/16* (2006.01)
*H04L 12/66* (2006.01)
*H04L 12/28* (2006.01)

(52) U.S. Cl.
USPC ............ 370/260; 370/352; 370/395.21

(58) Field of Classification Search
USPC ............ 370/260, 401, 261, 262, 263, 265, 370/395.21, 395.3, 395.4, 352, 356, 241, 370/244, 242, 419, 420, 252; 709/203, 208, 709/219, 224; 379/32.1
See application file for complete search history.

(56) References Cited

U.S. PATENT DOCUMENTS

| 6,026,500 | A  | * | 2/2000  | Topff et al. ................. 714/26 |
| 2007/0286351 | A1 | * | 12/2007 | Ethier et al. .............. 379/32.01 |
| 2008/0175228 | A1 | * | 7/2008  | Chang et al. ................ 370/352 |
| 2008/0201468 | A1 | * | 8/2008  | Titus ......................... 709/224 |
| 2009/0238085 | A1 | * | 9/2009  | Khanduri ..................... 370/252 |

* cited by examiner

*Primary Examiner* — Hanh N Nguyen

(57) ABSTRACT

A method and system and computer readable medium for a voice quality measuring device that provides real-time, near real-time or contemporaneous voice quality statistics about impairments external to the voice quality conference bridge system, i.e. from participant's calls coming from a communication network into a voice quality conference bridge system is disclosed. The reports generated by the voice quality statistics provided by the voice quality measuring device will enable carriers to identify voice quality impairments. Moreover, the reports will also enable the customers to see, by means of the voice quality statistics, on a call-by-call basis, whether any voice quality impairments are external to the conferencing bridge system.

20 Claims, 5 Drawing Sheets

REAL TIME VOICE QUALITY STATISTICS IN AUDIO TELECONFERENCING

BACKGROUND OF THE INVENTION

The current invention is related to audio conferencing networks. More specifically, the invention is related to a voice quality monitoring device that provides real-time or near real-time statistics about per call quality statistics in an audio conferencing networks.

Audio conferencing network, i.e. conference calls let groups of people, from a few to hundreds, communicate by phone. Conference calls connect people through a conference bridge which is essentially a server that acts like a telephone and can answer multiple calls simultaneously. Software may play a large part in bridge's capabilities beyond simply connecting multiple callers. Businesses typically have a private exchange branch (PBX) within their offices. The PBX is a switched network of telephone connections inside the office. Each phone coupled to a PBX has an extension, and multiple phones share lines to the public switched telephone network (PSTN) outside the office.

Conference calls play a significant role in today's business life. In conference calls, where some users share a common conference room, while others are at remote locations, the voice quality from users speaking in the conference room is often poor when using a standard conference phone with a hands free feature. This is also true when using a speaker phone from a home office, automobile or commercial office. Also, several states (such as California) are required to use hands free headsets or handsfree kits, etc. for their cellular telephones. This can interfere with the sound quality and background noise quite a bit. Sound quality impairments include background noise, acoustic echoes, air interface delays from cell phones, etc. IP phones have the added quality impairments that include packetization delay and hybrid echo delay.

When voice quality is impaired, customers often blame the carrier. Recent studies indicate that customers experiencing at least one voice quality control problem are three times more like to say they will switch carriers in the future. Carriers, vendors service providers, etc. can benefit greatly from the comprehensive ability to measure voice quality, identify impairments, and mitigate the impact the impact on impairment rates.

However, there is currently no method or device that presents the real-time or near real-time voice quality statistics of the calls to the attendees, operators or moderators that are external to the audio conferencing network. Thus, a method and device are needed which can measure the voice quality of call and exchange that information with an application server in a real-time manner. The application server, in turn, will present the voice quality statistics of the audio conferencing network call impairments that originate both internally and externally of the audio conferencing network in real-time or near real-time to the operator, moderator, customer or API through an interface.

SUMMARY OF THE INVENTION

There is currently no method or device that presents, in real-time, near real-time or contemporaneously, a voice quality statistics report to the operators, moderators or customers regarding impairments that are external to (i.e. per-call quality impairments coming from the public switched telephone network (PSTN) or other communications networks into the conference system and/or internal to the conferencing system. Thus, a method, system and computer readable medium is needed which can collect quality measurements on a per-call basis and present the voice quality statistics of the conferencing system's call impairments that originate both externally (i.e., the quality of the participant's call) and internally to the conferencing system in real-time, near real-time or contemporaneously through an interface such as a web page or graphical user interface, to the operator, moderator, automatic application programming interface and/or customer.

A method for determining real time voice quality statistics for each participant in an audio conference bridge is disclosed. The method comprises generating the audio conference bridge through a plurality of participant's calls; coupling a voice quality measuring device with the audio conference bridge to collect and measure voice quality statistics concerning at least one of the participant's calls; and reporting in real-time or near real-time voice quality statistics collected and measured from the voice quality measuring device communicatively coupled to an application server to an operator, a moderator, an automatic application programming interface and/or customer.

A system for providing real-time or near real-time voice quality statistics for a conference call customers in an audio conference bridge that allows the customers to obtain information about real time impacts from their calls coming from the public switched telephone network (PSTN) or any communication network into the audio conference bridge is disclosed. The system comprises a conference bridge adapted to accept a plurality of conference calls from attendees in a conference call; a voice quality measuring device adapted to be communicably coupled to the conferencing bridge, wherein the voice quality measuring device provides real time statistics regarding at least one of the plurality of conference call's quality impacts from the PSTN into the conference bridge; and an application server communicably coupled to the voice quality measuring device, the conferencing bridge and the PSTN, wherein the application server dispatches voice quality statistics between the voice quality measuring device and an operator, a moderator, an automatic application programming interface and/or customer through a web page or a graphical user interface or other interface.

BRIEF DESCRIPTION OF THE DRAWINGS

The above and other aspects, features, and advantages of the disclosure will become more apparent in the light of the following detailed description when taken in conjunction with the accompanying drawings in which.

DETAILED DESCRIPTION OF THE DRAWINGS

Customers involved in a teleconferencing situation most often currently dial into an audio conference and can optionally login to a web interface to see their conference information real-time on a web page that updates periodically or as needed. A customer may be the participant themselves or may be a company that regularly uses teleconferencing as a method of communication, either internally within the company or as a tool to communicate externally, for example, with business associates of a company. In the latter scenario, a company may have a few to hundreds of participants in a teleconference.

Most web-based conferencing companies/carriers offer a web-based moderator tool to see and mute participants in an audio conferencing bridge. However, while most conferencing companies already clear out, for example, background noise from a cell phone user in a car, there are no tools or software packages that are able to provide real-time or near real-time statistics about each call leg's (participant's) quality impairments internal or external to the audio conferencing bridge. Near real-time is defined as the timeliness of data or information which has been delayed by the time required for electronic communication and automatic data processing. This implies that there are no significant delays.

A voice quality measuring device as disclosed in the invention will be able to provide real-time or near real-time voice quality statistics about the impairments from conferencing companies'/carrier's calls that coming from the public switched telephone network (PSTN) or any other type of communication network into the audio conferencing voice quality system. The voice quality statistics provided by the voice quality measuring device will also provide the customer with caller-by-caller voice quality statistics about their participant's calls coming from the PSTN or any other type of communication network into the audio conferencing voice quality system.

Figure 1:
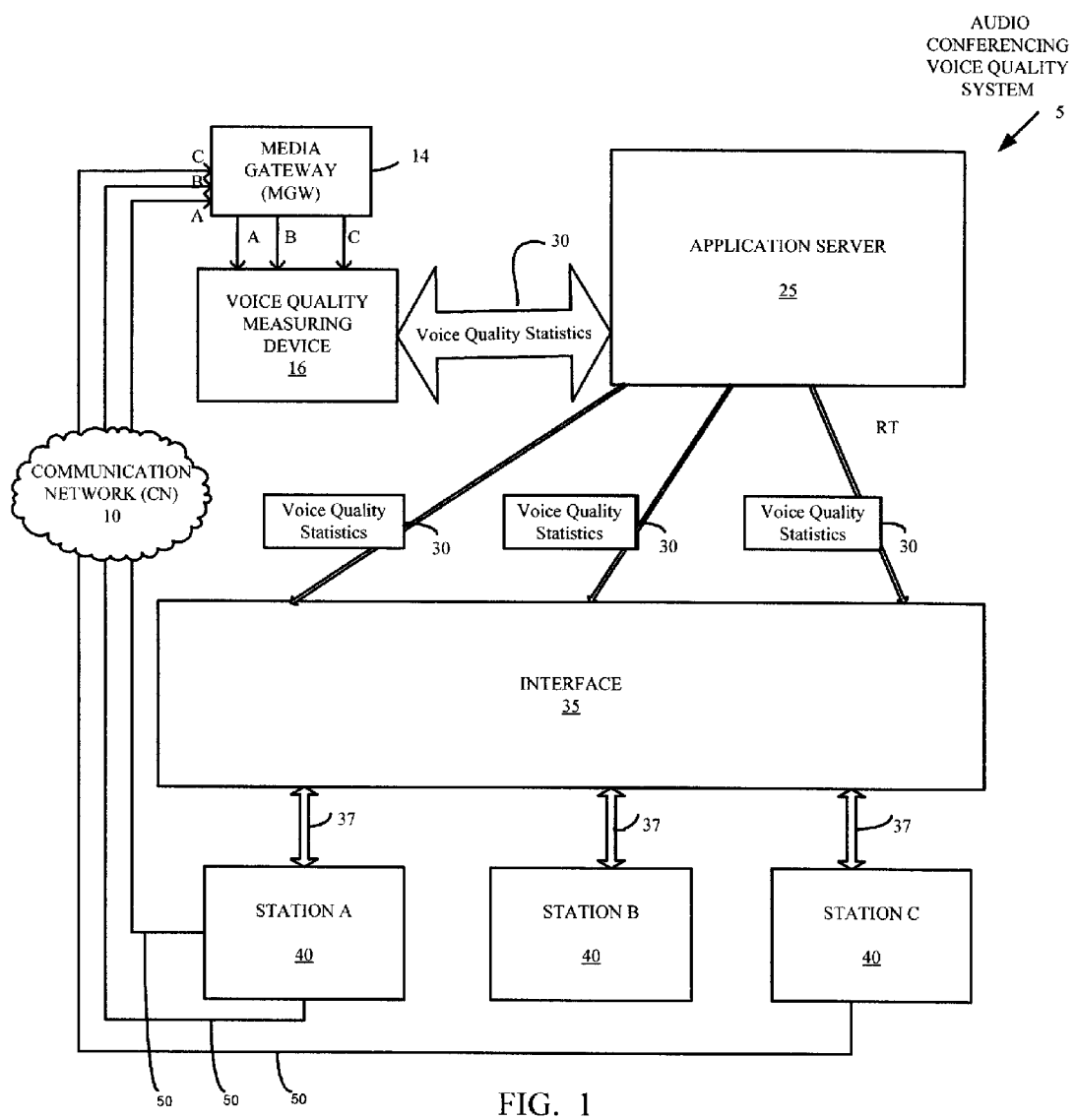
FIG. 1 is a simplified block diagram of the voice quality measuring system of the invention and three participant stations.

FIG. 1 illustrates a simplified block diagram of an embodiment of an audio conferencing voice quality system 5. It will be recognized that some or all of the components described could be distributed across multiple servers or other hardware. This embodiment of the audio conferencing voice quality system 5 includes a media gateway (MGW) 14 and a voice quality measuring device 16. The audio conferencing voice quality system unit 5 may comprise any number of different hardware configurations, including a personal computer or DSP platform. It should be understood that this embodiment is exemplary only and many other configurations may exist, including additional participant stations, additional hardware or software, etc.

Audio conferencing voice quality system 5 comprises a simplified general organization of audio conferencing voice quality system 5 that contains a number of units. In the embodiment shown, a number of conference participant stations (A, B and C) are communicably coupled through PSTN and/or any type of now known communication network 10 or any type of communication network to be developed in the future with a media server 14 and a voice quality measuring device 16, an application server 25, and interface 35. Note that the number of participant stations is exemplary only. The media server (MGW) 14 is generally responsible for receiving and collecting data from the participant stations 40 and transferring that data into voice quality measuring device 16. Voice quality statistics 30 are either pushed to the application server or pulled from the application server 25 (as discussed in detail below). Voice quality statistics 30 are transferred via application server 25 coupled to an interface 35. Voice quality statistics 30 both external to and internal to the audio conferencing voice quality system 5 are analyzed, summarized and reported to an operator, a moderator, an automatic application programming interface (as will be discussed in detail below) or a customer through a web page, other graphical user interface (GUI), or any other interface now known or o be developed in the future, to be viewed in real-time or near real-time. Impairments can be corrected in real-time, near real-time or contemporaneously by an operator, a moderator, an API or a customer. For example, the operator, moderator, or customer viewing interface 35 through connection 37 may decide to disconnected the participant station, mute the volume, etc. if the impacts from a participant station from the PSTN and/or communication network 10 into the audio conferencing voice quality system are disrupting the conferencing experience of the rest of the participants. In another embodiment, to be discussed fully below, an automatic application programming interface can be used by an operator or moderator to facilitate automatic actions to be taken by the application programming interface (API). In another embodiment, the automatic application programming interface may interact directly with the interface. For example, if participant A, has a high degree of echo and background noise as shown from the voice quality statistics 30 as measured through the voice quality measuring device 16, and the system provides a command to reduce the high degree of echo and background noise as shown from the voice quality statistics, the automatic application programming interface can react directly to that command and correct the deficiency.

In another example, if participant A, has a high degree of echo and background noise as shown from the voice quality statistics 30 as measured through the voice quality measuring device 16, the operator, the automatic application programming interface, through and operator or moderator (as discussed below) or moderator can review this data in real time through the interface 35 and disconnect or mute the call of participant A.

As used herein, a user is referred to in its broadest sense as in that it may include person or thing that utilizes a particular resource. Depending on the context in which the invention is used, a user may be, for example, a participant in a conference call employing an audio bridging unit, a caller calling into a call center, a software program utilizing computing resources of a processor, a communication device utilizing transmission media having a finite bandwidth and the like.

Although both the media gateway 14, application server 16, and voice quality measuring device 25, unit could be implemented purely in hardware, it is preferred that the each and/or all units 14, 16, and 20, comprise a computer program running on an appropriate hardware platform.

In an embodiment of the invention, the media interface between the conference participant stations 40 and the audio conferencing voice quality system 10 may be over a separate communications network, such as the public switched telephone network (PSTN), a packet-switched network, or a combination of the two in which a PSTN-to-packet-switched network gateway is traversed. The participant stations 40, however, can be connected to the present system by any communications network, including local area networks (LAN), private networks, circuit-switched networks, etc.

Customer-participant stations 40 (A, B and C) are communicably coupled to the media server 14 though PSTN and/or communication network 10. The media server (MGW) 14 acts as a translation unit between disparate telecommunications networks, such as PSTN; Next Generations Networks, etc. Because the MGW 14 connects different types of networks, one of its main functions is to convert between the different transmission and coding techniques. The MGW 14 performs functions such as media stream packetization and depacketization, automatic gain control acoustic echo cancellation, and lower layer protocol handling (such as RTP and TCP/IP). MGW's 14 are controlled by a media gateway controller (not shown) which provides the call control and signaling functionality, for example, Voice over Internet Protocol (VoIP). MGWs 14 perform the conversion between time division multiplexing (TDM) voice and VoIP. Mobile access MGWs 14 connect the radio access networks of public land mobile network (PLMN) to a Next Generation Core Network. Media gateway controllers use signaling commands that establish and terminate the call as well as provide may other functionalities including conference calling. For example, the signal commands are defined in a signaling protocol including, but not limited to as H.323, MGCP or MEGCO as well as any other signaling protocols now known or to be developed in the future. Signaling protocols are well known by those of ordinary skill in the art.

Audio conferencing voice quality system 5 contains voice quality measuring device 16. Participant stations 40 (A, B and C), are each coupled to voice quality measuring device 16 through MGW 14 and PSTN and/or communication network 10. Voice quality measuring device 16 derives a standards based MOS (discussed in detail with regard to FIG. 3) value that includes impairments that are external to the network, i.e. the audio conferencing voice quality system 5.

Figure 2:
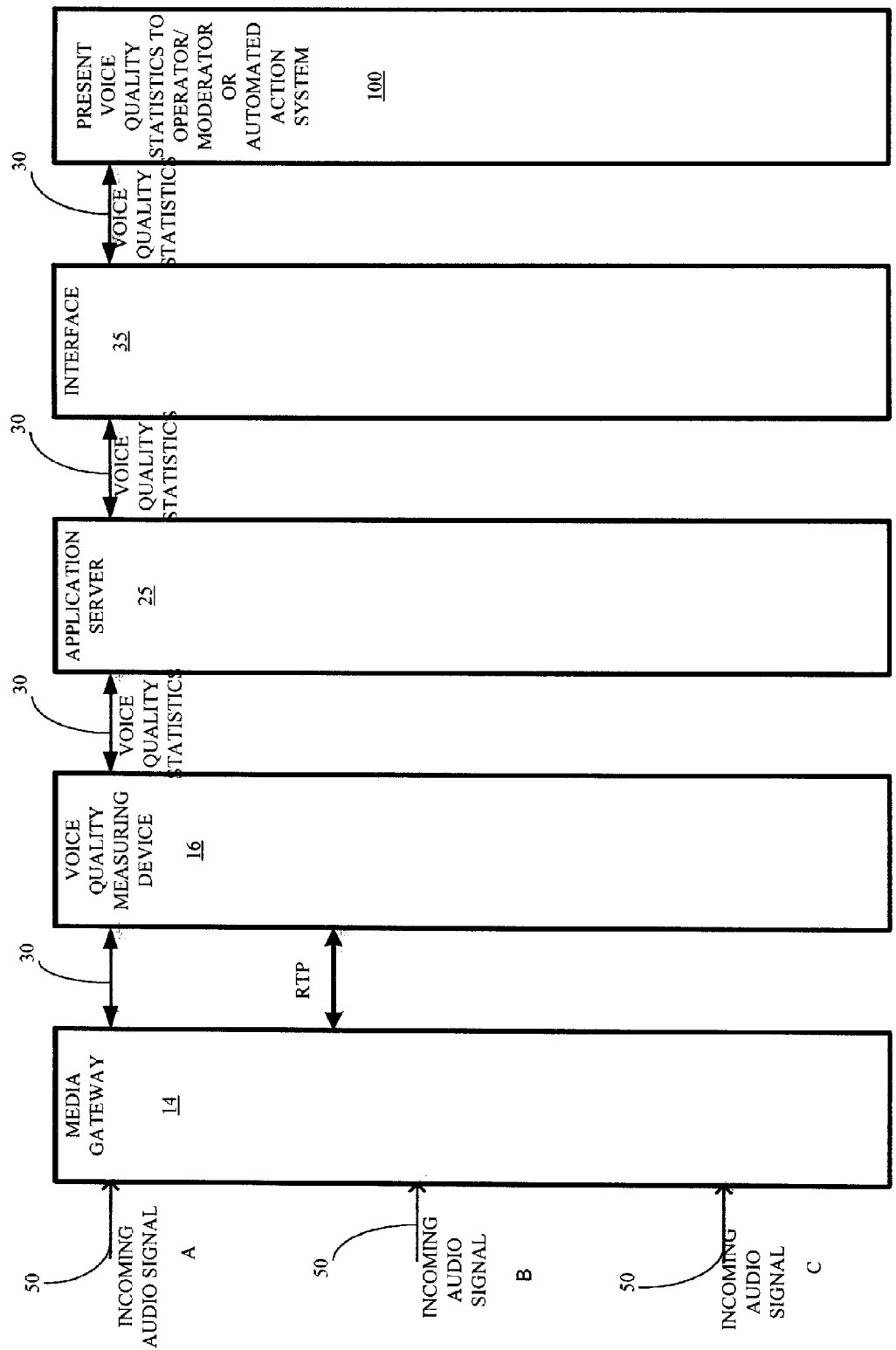
FIG. 2 is a flow diagram corresponding to the system illustrated in FIG. 2

FIG. 2 illustrates generally the flow of the audio conferencing voice quality system 5 of FIG. 1. Incoming audio signals 50 through PSTN (not shown) or any communication network are received and transmitted to the audio conferencing voice quality system 5 through media server (MGW) 14. MGW 14 is communicably coupled to and provides the media interface between the PSTN or any other communications network and the communications network(s) that is/are being used by the participant stations 40 to send and receive audio signals. The networks that may be used by the participant stations 40 include, but are not limited to, wireline, VoIP, and cellular and any other communications network now known or developed in the future.

In one embodiment, incoming audio signals 50 from the participant stations 40 to the audio conferencing voice quality system 5 are received through the MGW 14 to the voice quality measuring device 16 where they are measured and reported as voice quality statistics 30. As will be discussed, reported voice quality statistics will give the conferencing companies or carrier and/or customer the ability to proactively detect and eliminate sources of external or internal impairment in their respective networks.

In this embodiment, voice quality measuring device 16 comprises a tool that measures and reports a comprehensive set of voice quality statistics including, but not limited to, transmission rating (R) factors (listening quality (R-LQ) and conversational quality (R-CQ), mean opinion scores (MOS) (listening quality (MOS-LQ) and conversational quality (MOS-CQ), noise levels, speech levels, hybrid echo delay, hybrid echo return loss, acoustic echo delay, weighted acoustic echo path loss echo objection rate per ITU-T g.131, packet jitter, packet delay, packet counts, etc. The data are collected continuously and non-intrusively on all channels on a per-call basis.

For example, an increasing number of calls originate from noisy urban environments where call quality can be negatively affected by background noise. The voice quality measuring device 16 measures per-call speech level, noise level, and signal-to-noise ratio (SNR) in both directions to identify and report unwanted noise in a call. Moreover, the migration of voice networks from circuit to packet technologies is resulting in greater and more variable latency. The majority of legacy hybrid echo cancellers are unable to handle this added delay, leaving callers unprotected from annoying hybrid echo. In addition, the proliferation of participant choices in terminal equipment (handsets, headsets, and hands free kits) continues to expand rapidly without necessarily providing adequate acoustic isolation, exposing more users to acoustic echo. Voice quality measuring device 16 provides comprehensive statistics about echo delay and return loss for both hybrid (linear) echo and acoustic (non-linear) echo. The voice quality measuring device 16 monitors from 0 to 400 ms in both directions, ensuring complete and accurate measurement of echo. For a statistical understanding of how echo and delay combine to affect customer satisfaction, voice quality measuring device 16 also provides Echo Objection Rates per ITU-T G.131.

Transmission Rating Factors R factors and Mean Opinion Scores (MOS) pertaining to per-call listening and conversational R factor and MOS values are also computed continuously and non-intrusively based on the measured voice quality impairments (speech, noise, and echo) as well as codec type. The voice quality measuring device 16 objective scores follow the ITU-T G.107 E-Model standard and use a unique DSP-based approach to analyze live voice signal. The voice quality measuring device 16 employs a computational model to provide R factors and MOS scores for the following: listening quality (LQ), this score includes speech quality, noise, and voice level. It does not include impairments that affect conversation, such as delay and conversational quality (CQ), this score includes the impairments measured for the LQ score and adds echo and delay, which affect conversational quality.

In VoIP networks, packet characteristics can have a significant impact the quality of a call. The voice quality measuring device 16 measures and collects these statistics non-intrusively on an ongoing per-call basis to identify the source of the IP issues that affecting voice quality. For instance, the variation of inter-arrival time between packets adds to the delay because the jitter buffer adjusts to establish a constant input for decoding voice packets. Also, congestion, queuing, packet processing, and routing all affect the amount of delay a packet experiences when crossing an IP network. The packet delay affects the overall delay of the call and the amount of noticeable echo within a call. The voice quality measuring device 16 provides a packet jitter profile and packet delay information for each call. Per-call packet count measurements help determine whether speech quality issues are related to the packet network or are a result of other issues. The voice quality measuring device 16 provides a packet jitter profile for each call. The voice quality measuring device 16 packet count statistics include the total packets received per call, the number of discarded packets received per call and the number of lost packets per call.

The voice quality measuring device 16 reporting element analyzes and summarizes all network statistics. The report can include summary views of transmission quality at each network element, i.e. participant station, etc., detailed views of voice quality impairments, and historical data for trend analysis. The report comprises the comprehensive detail of the voice quality statistics 30.

In another embodiment, if an application programming interface or API language and message format is used in addition to an operator or moderator (as will be discussed in detail below), the API interface can automate actions and in effect is an automated action system. For example, an operator, moderator can predefine automatic actions for the API to take when certain voice quality impairments are summarized in the API's self created report (discussed below) or an audio conferencing voice quality system 5 created report.

An application programming interface or API is a language and message format used by an application program to communicate with the operating system or some other control program such as a database management system (DBMS) or communications protocol. APIs are implemented by writing function calls in the program, which provide the linkage to the required subroutine for execution. Thus, an API implies that some program module is available in the computer to perform the operation or that it must be linked into the existing program to perform the tasks. APIs are well known by those of ordinary skill in the art and those of ordinary skill in the art will perceive the vast performance value of presenting data to an API rather than to an operator or moderator. For example, the use of an API could trigger external systems. The API could be programmed to send out the report and simultaneously resolve the problem that is indicated in the report. For example, if the report states that the comprehensive detail of the voice quality statistics is an issue internal to a vendor's system, then the API can perform the operation to repair the problem. As one of ordinary skill in the art would see, there are many possibilities using API.

In yet another embodiment, an interactive voice response (IVR) or voice response unit (VRU) may be used in conjunction with an application programming interface to create an automatic API system. For example, if the command spoken by the interactive voice response (IVR) or voice response unit (VRU) is pre-defined phrase or key words programmed by the computer when a report is acknowledged on the interface, the automatic API would acknowledge the pre-defined phrase or key words, knowing that a command would issue. The interactive voice response (IVR) or voice response unit (VRU) would speak a pre-defined phrase or key word that would alert the automatic API that a command was going to be generated and to respond to the command. The automatic API would take action based on the command.

Whereas the in the above-mentioned embodiments, the application server 25, will exchange this information with an interface 35 to present the voice quality statistics of the calls from the PSTN or communication network into the audio conferencing voice quality system 5. In another embodiment, the application server 25 has the ability through a communicably coupled device such as a voice-enabled console in an automobile, a mobile telephone, a voice enabled personal computer, a interactive voice response unit, or any other voice enabled device or directly spoken words through a telephone, etc., wherein the corrective actions required are spoken as commands to the audio conferencing voice quality system 5. In this embodiment, the interface is a speech recognition interface. As with most speech recognition interfaces, usually a pre-defined phrase or key word is spoken first to inform the audio conferencing voice quality system 5 that a command is ready to be presented to the system. The operator, moderator, automated API, customer, VRU, etc. would speak the pre-defined phrase or key word which would alert the audio conferencing voice quality system 5 to listen for commands. Thus, allowing a user to speak commands from their conference connection. Action would be taken by the system based on the required action need for each command.

The voice quality statistics 30 can be collected from the voice quality measuring device 16 at preconfigured periodic intervals or only when specific voice quality statistics 30 change and reach certain detailed views of specific quality impairments based on quality thresholds. The voice quality statistics 30 might be pulled by the application server 25 from the voice quality measuring device 16 or pushed from the application server 25 to the voice quality measuring device.

The application server 25, in turn, will exchange this information with an interface 35 communicably coupled to the application server 25, such as, for example, a web page or operator/automatic API/customer interface to present the voice quality statistics of the calls from the PSTN or any other type of communication network into the audio conferencing voice quality system 5.

It will be recognized that other tools and interfaces may be coupled between the application server 25 and the voice quality measuring device 16. These tools may include, among others, a load balancer 318 and/or a conferencing media server 326. Note, that the tools may also be bundled together, for example, in many instances the application server and conferencing media server reside on the same unit, a single server performing the functionalities of both devices. Interface 35 can either act as a direct source to the operator, moderator, automatic API, application programming interface, customer or may be coupled to including, but not limited to, a personal computer, workstation, processor, CPU, telephone, or any other means for presenting data to, for example, an operator, automatic API, moderator or customer.

Figure 3:
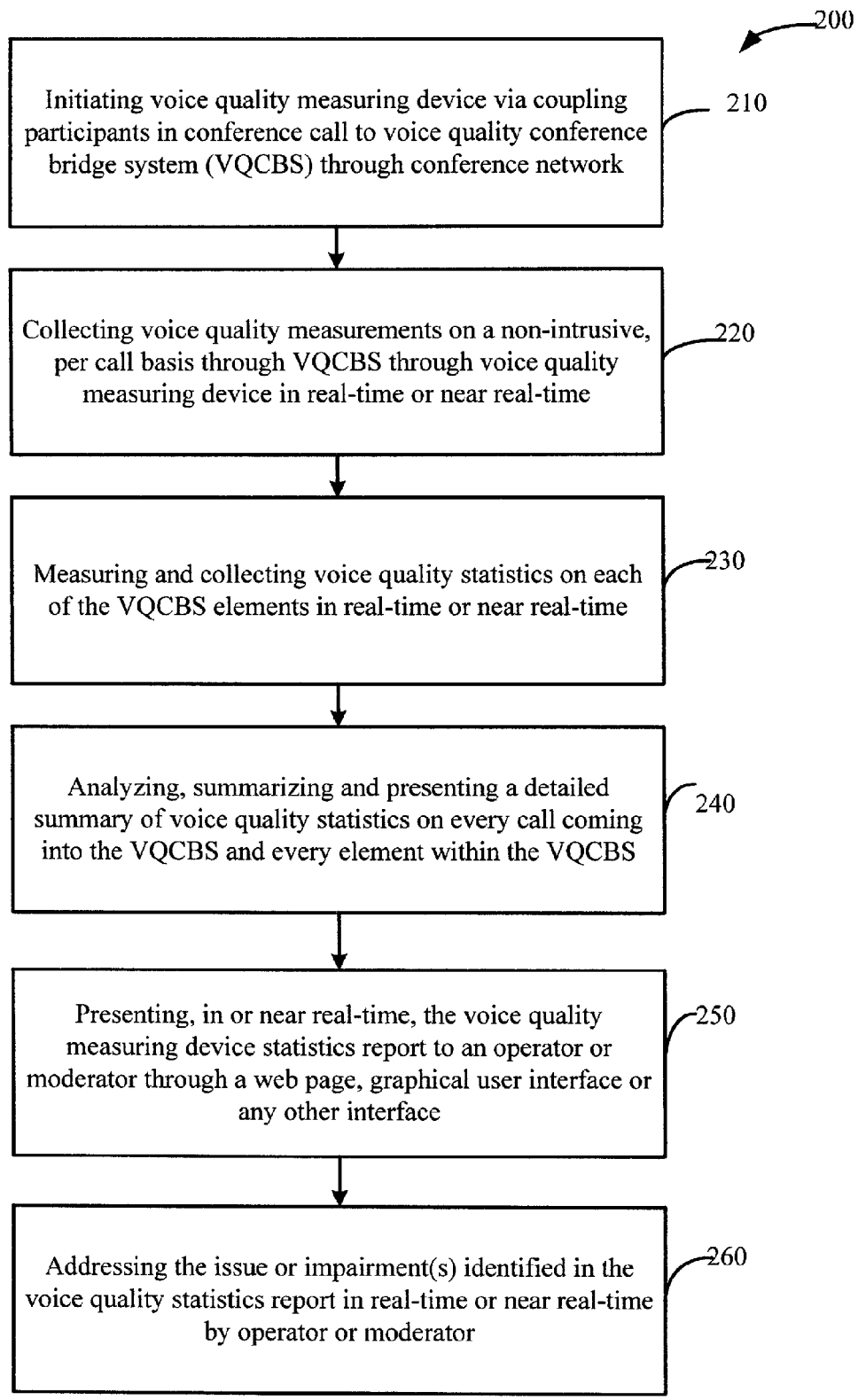
FIG. 3 illustrates a flow chart for the voice quality measuring system of FIG. 1.

Referring now to FIGS. 1 and 3, a voice quality measuring system flow chart for an audio conferencing voice quality system 5 is depicted. The flow begins at step 210, the audio conference network is initiated, for example, by coupling to an audio conferencing voice quality system 5 through the Public Switching Telephone Network (PSTN) or any communication network 10. At step 220, signals generated from the audio conferencing voice quality system 5 are communicably coupled to a voice quality measuring device 16. The voice quality measuring device 16 comprises a tool that measures and reports a comprehensive set of voice quality statistics 30 as set forth in detail in reference to FIGS. 1 and 2. The voice quality statistics 30 of each call are measured at step 230. The voice quality measuring device 16 measures and collects the voice quality statistics 30 on a per call basis of all calls coming into the audio conferencing voice quality system 5 from the PSTN or any communication network 10. At step 250, the voice quality statistics 30 are presented in real-time or near real-time to an operator, moderator or customer or automatic API actions 40 through a presentable interface 35, such as, for example, a web page, a graphical user interface (GUI), or any other user interface 35 now known or to be developed in the future. The voice quality statistics 30 of one or more individual call(s) in an audio conference can then be collected and presented back to the conference the operator, moderator or customer or automatic API actions 40 through the interface such that the conference the operator, moderator or customer or automatic API actions 40 can detect impairments that originate both inside and outside of audio conferencing voice quality system 5. Finally, at step 260, the operator, moderator or customer or automatic API actions can take action with regards to the caller or callers that are causing impairments to the system by muting the line, disconnecting the call or any other means necessary to preserve a valuable audio conferencing experience for those callers causing no impairments (internal or external) to the system.

Figure 4:
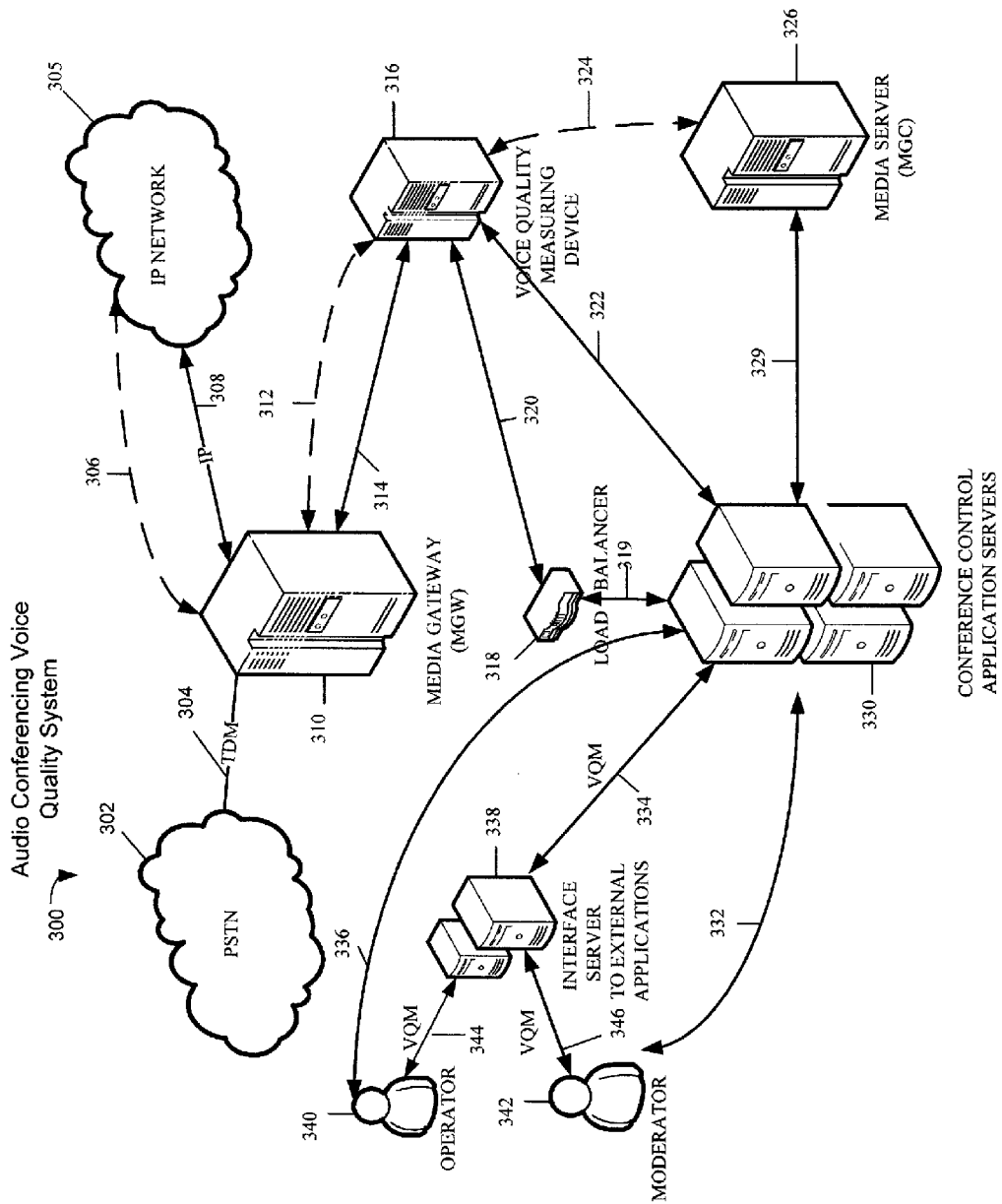
FIG. 4 is a logical diagram of the voice quality measuring system of the invention.

FIG. 4 is a logical diagram of a voice quality measuring system 300 of the invention. In general, a PSTN 302 is communicably coupled to media server 310 through a time division multiplexing (TDM) communication channel 304. As is well known in the art, TDM is a type of digital multiplexing in which two or more signals or bit streams are transferred apparently simultaneously as sub-channels in one communication channel, but are physically taking turns on the channel. The time domain is divided into several recurring timeslots of fixed length, one for each sub channel. An Internet Protocol (IP) Network is also communicably coupled to MGW 304, voice quality measuring device 316 and media server 326 through Real Time Transport Protocol (RTP) 306 and to MGW 310 through any type of IP connection including, but not limited to, wireless, DSL, modem, etc. As well known by those of ordinary skill in the art, RTP is defined as a standardized packet format for delivering audio and video over the Internet. RTP can carry any data with real-time characteristics, such as interactive audio and video. Call set-up and tear down for VoIP applications is usually performed by either SIP or H.323 protocols.

MGW 310 is communicably coupled to voice quality measuring device 316, which in turn, is communicably coupled to media server 326, application server 330 and load balancer 318 through an exchange of voice quality statistics 324, 322, and 320 respectively. In addition, media server 326 and load balancer are also communicably coupled to application through an exchange of voice quality statistics 328 and 319 respectively. Application server is communicably coupled through an exchange of voice quality statistics 334 to interface to external applications 338. Operator 340 or moderator 342 may have their own PCs communicably coupled through an exchange of voice quality statistics 344, 346 or view interface 338 directly.

Through the PSTN 302, impairments that are external to the audio conferencing system that the voice quality measuring device includes when measuring and collecting the voice quality statistics include: background noise, mismatched voice levels, acoustic echoes, air interface delay from cell phones; and background noise mismatched voice levels and acoustic echoes from a POTS phone. Through IP Network, impairments that are external to the system on the IP phone and cell phone, POTS phone the impairments are the same except the IP phone has the added impairment of packetization delay and hybrid echo delay from the PSTN. Impairments that are internal to the audio conferencing system that the voice quality measuring device includes when measuring and collecting the voice quality statistics include: packetization delay, packet delay, packet loss and packet jitter are due to the IP Network and variable network delay and hybrid echoes from the PSTN. The MGW 310 is then communicably coupled as set forth above to all other devices in the system through an exchange of voice quality measurements. As is shown in the logical diagram of the system, all the arrows in the exchange of voice quality measurements point in both directions. Thus, showing that the voice quality measuring device is consistently measuring, collecting and reporting data on both internal and external impairments in the audio conferencing system on a non-intrusive, per-call basis.

Operator 340 and/or moderator 342, once they have seen the report on both internal and external impairments in the audio conferencing system, may be communicably coupled to application server 330 via a session initiation protocol (SIP), a signaling protocol used for setting up or tearing down multimedia communications sessions over the internet such as voice or VoIP calls over the Internet. Thus, an operator 340 or a moderator 342 has the ability to address an impairment reported by the voice quality measuring device 316 via SIP lines 336 and 332 respectively. For example, if a call needs to be disconnected to a severe disturbance, the operator 340 or moderator 342 can review the report, see what call is causing the impairment and disconnect the call through the SIP line(s) 336, 332 through the application sever 330.

Although an exemplary embodiment of the system of the invention has been illustrated in the accompanied drawings and described in the foregoing detailed description, it will be understood that the invention is not limited to the embodiments disclosed, but is capable of numerous rearrangements, modifications and substitutions without departing from the spirit of the invention as set forth and defined in the following claims. For example, the capabilities of the invention can be performed fully and/or partially from by one or more device and/or server, by a virtual automated call conferencing system or manually operated call conferencing system, work at home participant stations, mobile/cellular stations, in-house conference centers, desk top conference environment. Moreover, the these capabilities may be performed in the current manner or in a distributed manner and on, or via any device able to provide and/or receive broadband signals. Further, although depicted in a particular manner, various modules, blocks or servers may be repositioned without departing from the scope of the current invention. For example, as depicted in FIG. 4, while shown as separate physical units in FIG. 4 for clarity, the logical functions performed by the media gateway controller 326 and the load balancer 318 that both exhibit enhanced performance as software programs residing on the media gateway 316.

Figure 5:
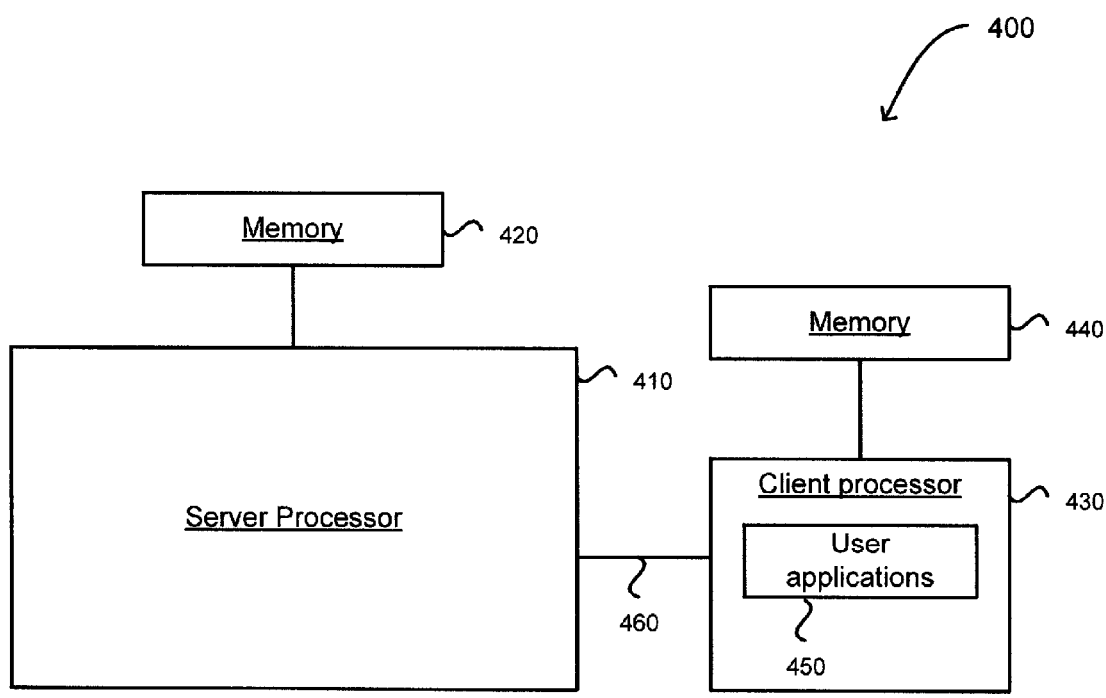
FIG. 5 is a high level block diagram illustrating the relationship of the server processor with the client processor according to one embodiment of the invention.

FIG. 5 is a high level block diagram illustrating the relationship of the server processor with the client processor 400 according to one embodiment of the invention. In one embodiment, the server 330 of FIG. 4 may include at least one processor 410 operatively associated with at least one memory 420, as shown in FIG. 5. The memory 420 may store software or instructions that are executable on the processor 410. The processor 410 may be in communication with a processor 430 of a client as the client interface server 338 depicted in FIG. 4, such as a user operating the applications 450 on a web browser as described above. The user processor 430 may also be operatively associated with a memory 440 that stores an instruction set for execution by the user processor 430. The server processor 410 may communicate with the user processor 430 through an appropriate communications link 460 such as the internet. An instruction set that may be executed on the processors 410, 430 is depicted in the flowchart 200 of FIG. 3. In the combined instruction set, the server processor 410 initiates the voice quality measuring device by coupling participants in a communication network to the voice quality conference bridge system 210. At step 220, 230, the server processor 410 provides the voice quality statistics to the server processor 410, which receives the voice quality statistics at step 240. The server processor 410 then analyzes the event stream at step 240. Analyzing the event stream determines any impairments that are identified in an per-call portion of the voice quality measuring device that are identified in a measuring and collection of voice quality statistics of each device of the voice quality bridge system. The user processor 430 receives through the user application 450 a detailed report identifying any impairment in the system, internal or external to the audio conference bridge system.

While the server is depicted as a single entity, a person skilled in the art will readily understand that the server may be provided as multiple servers or with multiple components and in a distributed form.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. In addition, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. In addition, the information sent between various modules can be sent between the modules via at least one of a data network, the Internet, an Internet Protocol network, a wireless source, and a wired source and via plurality of protocols.

What is claimed is:

1. A method for determining real time voice quality statistics for each participant of an audio conference, comprising:
    generating the audio conference comprising a plurality of participant calls;
    utilizing a voice quality measuring device to collect and measure voice quality statistics concerning at least one of the participant's calls of the audio conference;
    reporting in real-time or near real-time voice quality statistics collected and measured from the voice quality measuring device communicatively coupled to an application server to at least one of an operator, a moderator, a customer, and an automatic application programming interface; and
    detecting a deficiency impact of the measured voice quality statistics as measured through the voice quality measuring device, and providing an automatic command via an automatic application programming interface to reduce the deficiency impact as indicated from the voice quality statistics to correct the deficiency.

2. The method of claim 1 further comprising collecting voice quality statistics data continuously and non-intrusively on an all channels of the audio conference on a per-call basis.

3. The method of claim 1 wherein voice quality statistics include transmission rating (R) factors including listening quality (R-LQ) and conversational quality (R-CQ), mean opinion scores (MOS) including listening quality (MOS-LQ) and conversational quality (MOS-CQ), noise levels, speech levels, hybrid echo delay, hybrid echo return loss, acoustic echo delay, weighted acoustic echo path loss echo objection rate per ITU-T g.131, packet jitter, packet delay or packet counts.

4. The method of claim 1 wherein reporting to at least one of an operator, an automated application programming interface, an automated action system, a moderator and a customer in real-time or near real-time comprises reporting via a at least one of a web page, and graphical user interface.

5. The method of claim 1 wherein the customer observes the real-time or near real-time impacts regarding the participant calls that are coming from a PSTN as part of the audio conference.

6. The method of claim 5 further comprising addressing the impacts regarding at least one of the participant's call in real time by at least one of the operator, an automated application programming interface, an automated action system, the moderator and the customer.

7. The method of claim 5 wherein addressing the impacts regarding the at least one participant's call includes at least one of the operator, an automated application programming interface, an automated action system, the moderator and the customer muting the call, disconnecting the call, and adjusting the volume.

8. The method of claim 1 wherein the voice quality statistic monitoring device allows the voice quality statistics of at least one of the participant's calls of the audio conference to be displayed to an application programming interface via a web page or other graphical user interface such that the application programming interface can automatically and internally report a problem and remedy the problem.

9. The method of claim 1 wherein the voice quality statistic monitoring device allows the voice quality statistics of at least one of the participant's calls in the audio conference bridge to be displayed to an operator.

10. The method of claim 1 wherein the voice quality statistic monitoring device allows the voice quality statistics of at least one of the participant's calls in the audio conference to be displayed to a moderator via a web page or other graphical user interface via the Internet in real time or near real time.

11. The method of claim 1 further comprising the application server collecting voice quality statistics from the voice quality measuring device at preconfigured intervals.

12. The method of claim 1 further comprising the application server collecting voice quality statistics from the voice quality measuring device only when the statistics change and reach a preselected threshold.

13. The method of claim 1 further comprising pulling real time voice quality statistics by the application server from the voice quality measuring device.

14. The method of claim 1 further comprising pushing real time voice quality statistics to the application server from the voice quality measuring device.

15. The method of claim 1 further comprising coupling the application server to a media gateway through the voice quality measuring device.

16. The method of claim 1 further comprising coupling the application server to a media gateway through the voice quality measuring device, a load balancer and a conference media server.

17. The method of claim 1, wherein the automatic application programming interface is a voice recognition interface.

18. The method of claim 1 further comprising a voice response unit employed in conjunction with the automatic application programming interface, and wherein the voice response unit issues a command in response to reporting voice quality statistics collected and the automatic application programming interface takes action based upon the command.

19. The method of claim 1 wherein at least one of the operator and the moderator predefines actions for the automatic application programming interface to initiate when certain voice quality impairments are summarized in the report.

20. A system for providing real-time or near real-time voice quality statistics for a plurality of customers participating in an audio conference that allows the plurality of customers to obtain information about real time impacts from a plurality of calls coming from the public switched telephone network (PSTN) into the audio conference comprising:
    a media gateway configured to accept a plurality of calls from attendees in a corresponding audio conference;
    a voice quality measuring device configured configured to provide real time statistics regarding at least one of the plurality of call's quality impacts from the PSTN into the audio conference; and
    an application server communicably coupled to the voice quality measuring device, and the PSTN, wherein the application server dispatches voice quality statistics between the voice quality measuring device and at least one of an operator, a moderator, and a customer through at least one of a web page and a graphical user interface, and wherein the application server is configured to detect a deficiency impact of the measured voice quality statistics as measured through the voice quality measuring device, and provide an automatic command via an automatic application programming interface to reduce the deficiency impact as indicated from the voice quality statistics to correct the deficiency.

\* \* \* \* \*